US012165459B2

(12) United States Patent
Juan Fernández

(10) Patent No.: US 12,165,459 B2
(45) Date of Patent: Dec. 10, 2024

(54) DEVICE AND METHOD FOR DISPENSING HOT AND COLD LIQUID PRODUCTS IN A DISPENSING MACHINE

(71) Applicant: JUAN Y JUAN INDUSTRIAL S.L.U., Valencia (ES)

(72) Inventor: Rafael Juan Fernández, Valencia (ES)

(73) Assignee: Juan Y Juan Industrial S. L. U., Valencia (ES)

( * ) Notice: Subject to any disclaimer, the term of this patent is extended or adjusted under 35 U.S.C. 154(b) by 379 days.

(21) Appl. No.: 17/783,498

(22) PCT Filed: Feb. 15, 2021

(86) PCT No.: PCT/EP2021/053661
§ 371 (c)(1),
(2) Date: Jun. 8, 2022

(87) PCT Pub. No.: WO2021/170444
PCT Pub. Date: Sep. 2, 2021

(65) Prior Publication Data

US 2023/0005322 A1 Jan. 5, 2023

(30) Foreign Application Priority Data

Feb. 26, 2020 (EP) .................................... 20382136

(51) Int. Cl.
*G07F 13/06* (2006.01)
*G07F 13/10* (2006.01)
*G07F 17/00* (2006.01)

(52) U.S. Cl.
CPC .......... *G07F 17/0078* (2013.01); *G07F 13/06* (2013.01); *G07F 13/10* (2013.01)

(58) Field of Classification Search
CPC ....... G07F 17/0078; G07F 13/06; G07F 13/10
See application file for complete search history.

(56) References Cited

U.S. PATENT DOCUMENTS

| | | | | |
|---|---|---|---|---|
| 4,724,752 | A | 2/1988 | Aliesch et al. | |
| 5,168,795 | A | 12/1992 | Okada | |
| 5,967,023 | A | 10/1999 | Acknin et al. | |
| 6,550,632 | B2 * | 4/2003 | Gubbini | A21C 9/08 221/13 |
| 9,384,621 | B1 * | 7/2016 | Chang | G07F 11/44 |
| 11,363,916 | B2 * | 6/2022 | He | A47J 36/321 |
| 2001/0002674 | A1 * | 6/2001 | Gubbini | G07F 9/105 221/13 |
| 2019/0069722 | A1 | 3/2019 | He | |

FOREIGN PATENT DOCUMENTS

| | | | |
|---|---|---|---|
| EP | 1107199 | A2 | 6/2001 |
| FR | 2718624 | A1 | 10/1995 |
| WO | 2017208177 | A1 | 12/2017 |

* cited by examiner

*Primary Examiner* — Frederick C Nicolas
(74) *Attorney, Agent, or Firm* — The Webb Law Firm

(57) ABSTRACT

The object of the invention is a device and method for dispensing hot and cold liquid products in a dispensing machine, stored in containers (2) provided with a cap (1), and wherein the device includes a storage mechanism (19) for the products, a dispensing mechanism (9) that collects and heats the liquid product (if the liquid product is to be served hot), an uncapping mechanism (16) intended to remove the cap (1) from the container (2), and a turning mechanism (8) that rotates the container (2) pouring the product in a vessel to be consumed by the user.

5 Claims, 10 Drawing Sheets

DEVICE AND METHOD FOR DISPENSING HOT AND COLD LIQUID PRODUCTS IN A DISPENSING MACHINE

CROSS-REFERENCE TO RELATED APPLICATIONS AND PRIORITY

This patent application claims priority from PCT Application No. PCT/EP2021/053661 filed Feb. 15, 2021, which claims priority from European Patent Application No. 20382136.8 filed Feb. 26, 2020. Each of these patent applications are herein incorporated by reference in their entirety.

OBJECT OF THE INVENTION

The object of the invention is a device and method for dispensing hot and cold liquid products in a dispensing machine, where a hot or cold product is served from a product stored in a container with a cap, the liquid products being dispensed to the user in a vessel, such as a glass or bowl.

BACKGROUND OF THE INVENTION

Today it is common to use vending machines that store products that must be refrigerated. The product is generally dispensed to the user at the temperature at which it is refrigerated, and in a container that the user has to open in order to consume it.

A first technical problem associated with this type of vending machine is that there are certain products that are usually consumed hot, such as soups or purees, and that these machines serve at very low temperatures, resulting in a negative experience for the user.

A second associated technical problem is that it is inconvenient for the user to have to open the product they have purchased in order to consume it, since they can stain or spill it over themselves in the process, especially in the case of liquid products.

The state of the art discloses devices that store hot and cold products in the same machine. These devices are very large as they comprise the mechanisms necessary to keep some products cold and others hot. In addition, products that are kept warm should not be stored in the device for very long periods of time, so they must be replaced regularly if they are not consumed.

Other alternatives for dispensing hot products that are disclosed in the state of the art are those devices that comprise a heater that heats a certain volume of water, in which the product is immersed or that is poured over the product container in order to heat it. These devices require an external water supply, as well as a structure that prevents it from coming into contact with the electrical components.

Similarly, document U.S. Pat. No. 5,168,795A describes an automatic food frying and vending system, having a refrigerated storage chamber for storing food material to be fried, and a frying chamber for frying material in cooking oil. The refrigerated chamber includes a stocker unit for receiving and keeping a number of packed containers, each sealed by a lid.

A holder and a cutter are disposed on a movable table which moves in a horizontal direction, so that, when the container is transferred to the holder, the holder is positioned in the vicinity of the storage chamber, and, when the sealed lid of the container is opened, the cutter is positioned over a frying basket in the frying chamber to enable the food material to be dropped by their own weight into the frying basket simultaneously with the opening of the sealed lid.

A guide member covers the top of a cup supported on a placement table. After filling with the cooked food, the table moves downwardly for removal of the filled cup from a takeout port.

Other devices are also known that pour the dispensed liquid product into a vessel, and that introduce electrical resistances in said vessel to heat the liquid.

This is a great disadvantage, since the electrical resistances come into contact with all the products to be dispensed, and there may be contamination when serving different products. Furthermore, it is unhygienic for the product to be dispensed to come into contact with internal elements of the machine.

In relation also to the field of automatic cooking of different foods, document US2019/0069722A1 describes an automated kitchen system, that comprises a plurality of ingredient containers, each configured to contain or store food ingredients; caps configured to close on the ingredient containers; a storage apparatus comprising compartments, each configured to store a plurality of ingredient containers, and a refrigeration mechanism, configured to cool the food ingredients in the container of the storage apparatus; transport boxes each configured to contain capped ingredient containers; a transportation apparatus configured to move the transport boxes; a cap opening apparatus configured to remove a cap from a capped container; a first transfer apparatus configured to move a capped ingredient container from a transport box to the storage apparatus, and also configured to move a capped ingredient container to a location on the cap opening apparatus.

DESCRIPTION OF THE INVENTION

The present invention proposes a device and method for dispensing hot and cold liquid products in a dispensing machine, where a hot or cold product is served from a product stored in a container, which enables the previously described problems of the state of the art to be solved.

Fundamentally, the present invention enables products to be stored in containers provided with a cap and to be dispensed, to be heated when they are products to be served hot, to remove the cap from the container, and to serve them to the customer in a glass or bowl. This is all carried out without any contact between the product and the dispensing machine, or the selected product and other products dispensed in the machine.

Therefore, the present invention comprises a fixed structure of the dispensing machine and a dispensing area where the product is heated, the cap is removed from the container and the product is served in a bowl. Likewise, it comprises a storage mechanism, preferably of the paternoster left type, which enables a greater number of containers to be stored compared to other devices of the state of the art.

The storage mechanism preferably comprises at least two pairs of gears, associated with the fixed structure, and two chains, each one associated with a pair of gears, to transmit the movement. At least one storage guide is positioned between both chains, which is parallel to the ground.

A pusher mechanism or a horizontal spiral is positioned on the storage guide, in which the containers of the dispensed products are placed, preferably secured by the cap, with the container hanging vertically from the guide. As the containers are dispensed, they are moved to one end of the storage guide either by means of the pusher or by means of the horizontal spiral.

By rotating the gears, movement is transmitted to the chains, which pull the storage guide that holds the products, to a predetermined position. As the containers are secured by the cap, a more efficient use of space is achieved, being able to store more containers in the same device.

The device further comprises a dispensing mechanism, which collects the container of the selected product from the storage guide. The dispensing mechanism comprises a dispensing clamp, intended to collect the product, preferably securing it by the cap. The dispensing clamp moves on a first guide, which is associated with the fixed structure, from the storage mechanism to the dispensing area.

The dispensing mechanism further comprises a heating clamp, which can move on a second guide, which is also associated with the fixed structure and perpendicular to the first guide, from a position away from the container, to the dispensing area, being intended to come into contact with the container holding the dispensing clamp.

In order to heat the dispensed product, the dispensing mechanism comprises a heater, positioned on the face of the heating clamp that comes into contact with the product. This heater has the advantage that it enables the product to be dispensed to reach a high temperature in a short period of time and without the need for direct contact with the product, which is advantageous for hygiene and sanitary reasons.

The device further comprises an uncapping mechanism, intended to remove the cap from the container once it has been heated. The uncapping mechanism comprises, first of all, a bent structure, associated with the fixed structure, and a mobile platform associated with said bent structure. The mobile platform can move with respect to the bent structure, from the dispensing area to a cap removal area.

The uncapping mechanism further comprises a motor, positioned on the mobile platform, and an uncapping element, which is associated with the motor. When the mobile platform is positioned in the dispensing area, the uncapping element is located over the cap of the container.

When the motor is started, the uncapping element rotates on itself and descends vertically, coming into contact with the cap, unscrewing and holding it once it has been removed from the container.

The uncapping mechanism further comprises a protrusion, associated with the bent structure, and positioned in the cap removal area. When the mobile platform moves from the dispensing area to the cap removal area, the uncapping element comes into contact with the protrusion, which exerts pressure on the uncapping element, the cap becoming separated and falling by gravity.

This uncapping mechanism therefore allows the cap to be removed from the container without the need to damage the latter, preventing the liquid product from coming into contact with any element of the device.

Lastly, the device comprises a turning mechanism, associated with the first guide and with the dispensing clamp. Once the product has been heated and the cap has been removed from the container, the turning mechanism rotates with respect to the first guide, preferably an angle of 180°, pulling the dispensing clamp, pouring the product out of the container, which no longer has a cap.

In an alternative embodiment of the invention, the device may comprise two separate container storage mechanisms, one for products to be served hot, and another for products to be served cold and can be refrigerated.

In this embodiment, it can be the same dispensing mechanism that collects the hot and cold products interchangeably, but in the event that the product is going to be dispensed cold, the heating clamp will not heat the container and its contents.

In a second alternative embodiment, the device comprises a second dispensing mechanism, a second uncapping mechanism and a second turning mechanism, responsible for dispensing, removing the cap and pouring the cold product into a glass, completely independently of the first dispensing mechanism, first uncapping mechanism and first turning mechanism, in this case responsible for products intended to be served hot.

Therefore, the invention enables liquid products to be dispensed, which may or may not be heated, directly in a bowl or glass, without the product coming into contact with any element of the device and without the user having to remove it from the container.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

PREFERRED EMBODIMENT OF THE INVENTION

An exemplary embodiment of the present invention is described below with help from FIGS. 1 to 11.

Figure 1:
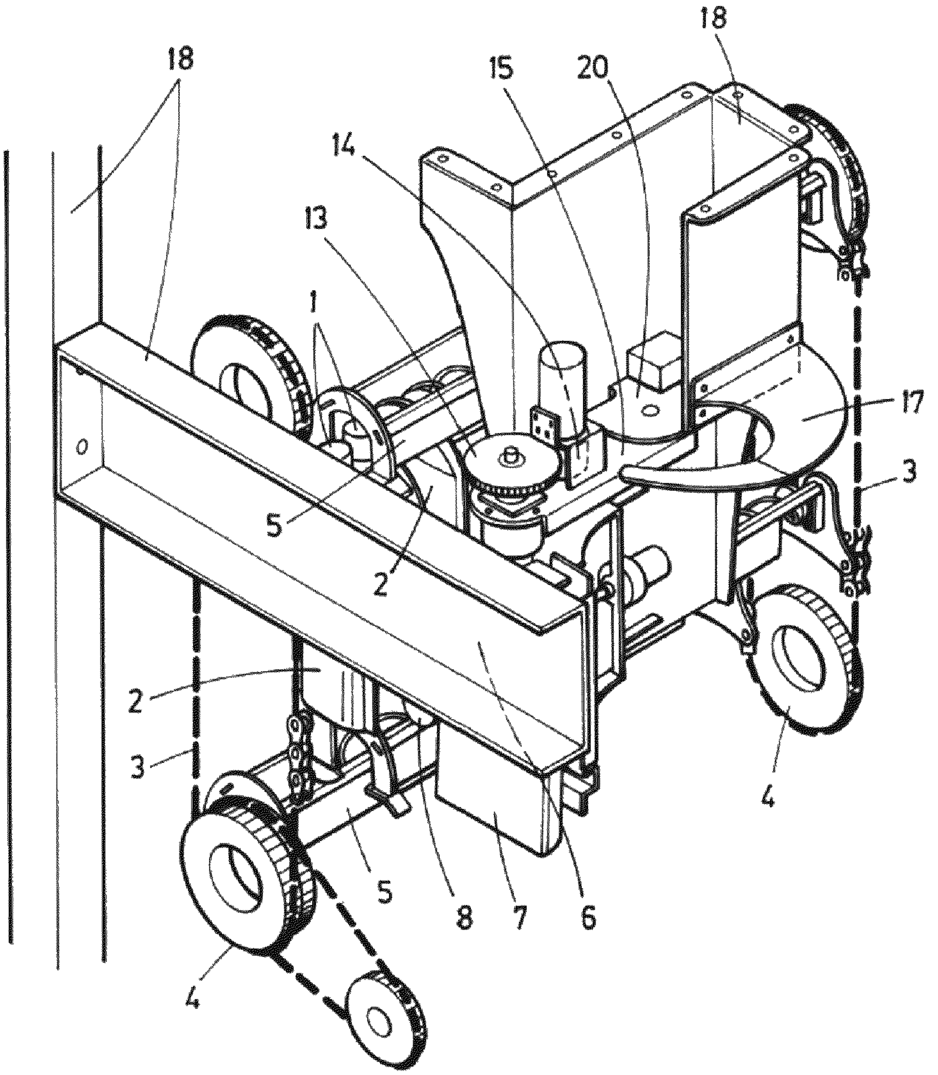
FIG. 1.—Shows a general view of the device in a dispensing machine for dispensing hot and cold products.

The present invention describes a device for dispensing hot and cold liquid products in a dispensing machine, stored in containers (2) provided with a cap (1), which is shown in FIG. 1. The device comprises a fixed structure (18) of the dispensing machine, a storage mechanism (19), a dispensing mechanism (9), a dispensing area, where the product is heated, the cap (1) is removed from the container (2) and the product is served in a glass, an uncapping mechanism (16) and a turning mechanism (8).

Figure 2:
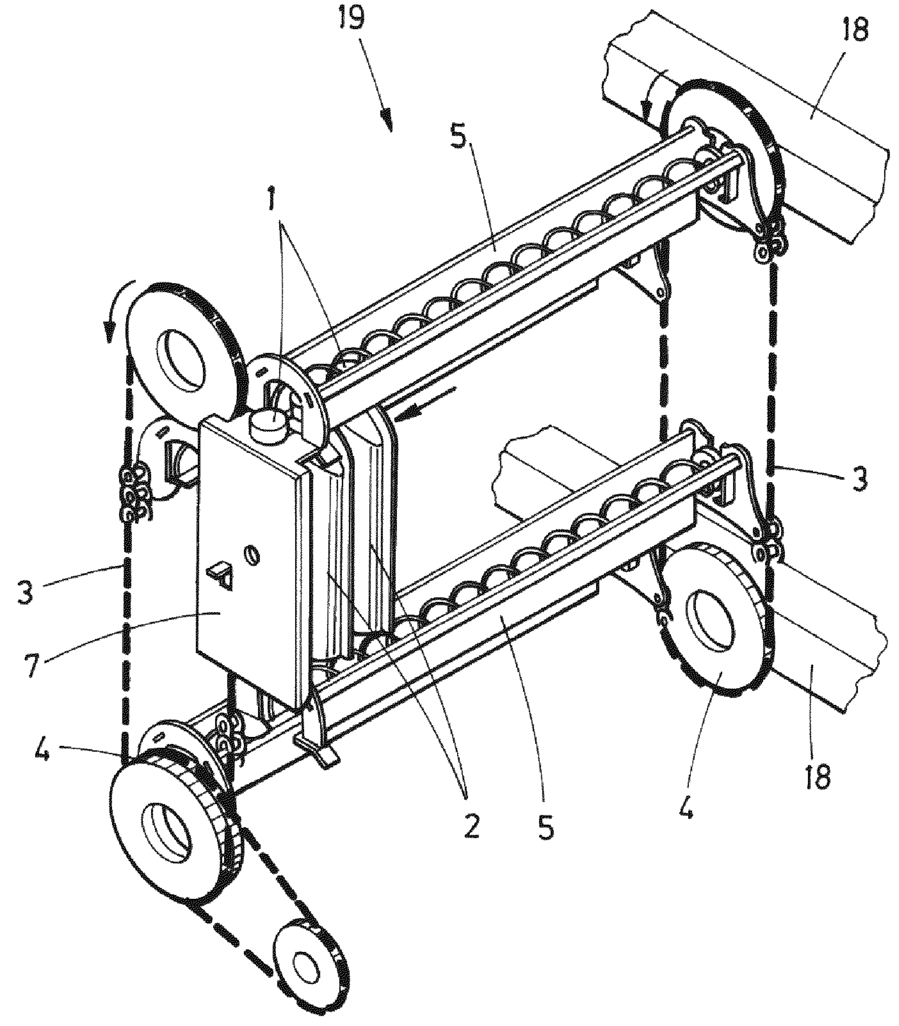
FIG. 2.—Shows a view of the storage mechanism.

The storage mechanism (19), which can be seen in FIG. 2 in a first embodiment, comprises two pairs of gears (4) associated with the fixed structure (18), and two chains (3), each one of them surrounding a pair of gears (1) and intended to transmit movement. The storage mechanism (19) further comprises at least one storage guide (5), attached to the two chains (3), parallel to the ground.

A horizontal spiral is positioned on the storage guide (5) in which the containers (2) secured by the cap (1) are placed, with the container (2) hanging vertically under the storage guide (5). The products advance to one end of the storage guide (5) due to the horizontal spiral rotating on itself. Alternatively, in a second embodiment, instead of a horizontal spiral, a pusher is located on the storage guide (5), which performs the same function of moving the containers (2) to the end of said storage guide (5) in order to be dispensed.

Figure 3:
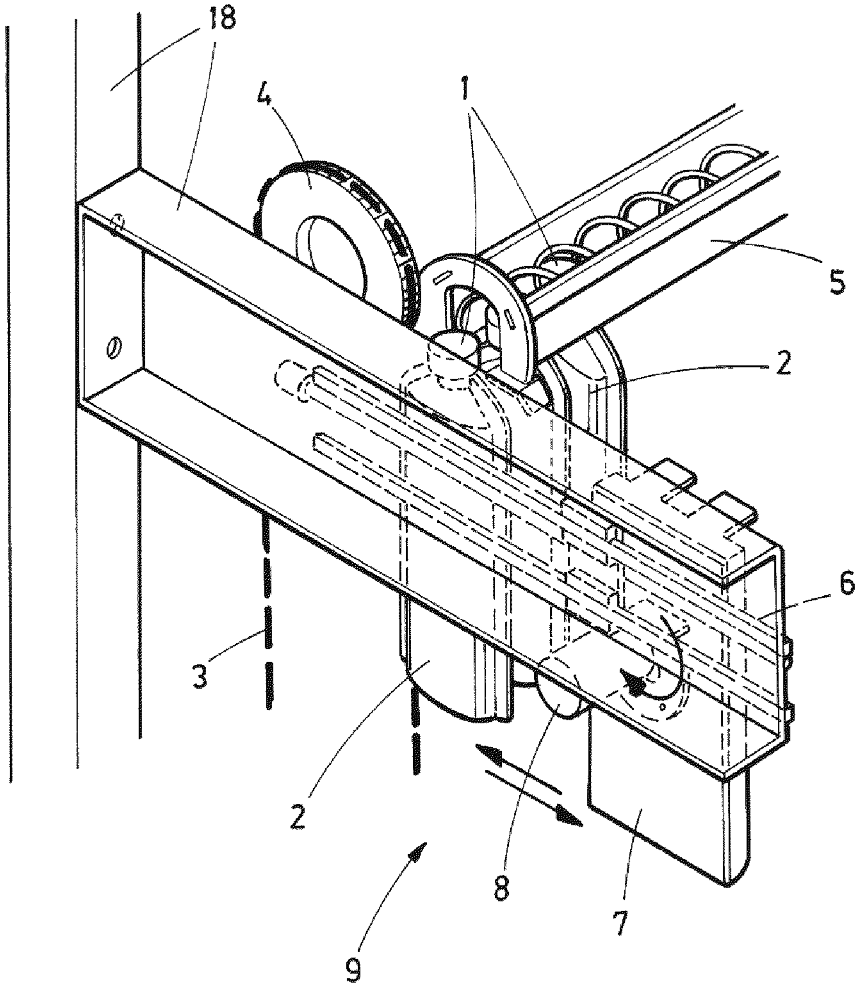
FIG. 3.—Shows a view of the dispensing mechanism when the dispensing clamp moves to collect the container.
Figure 4:
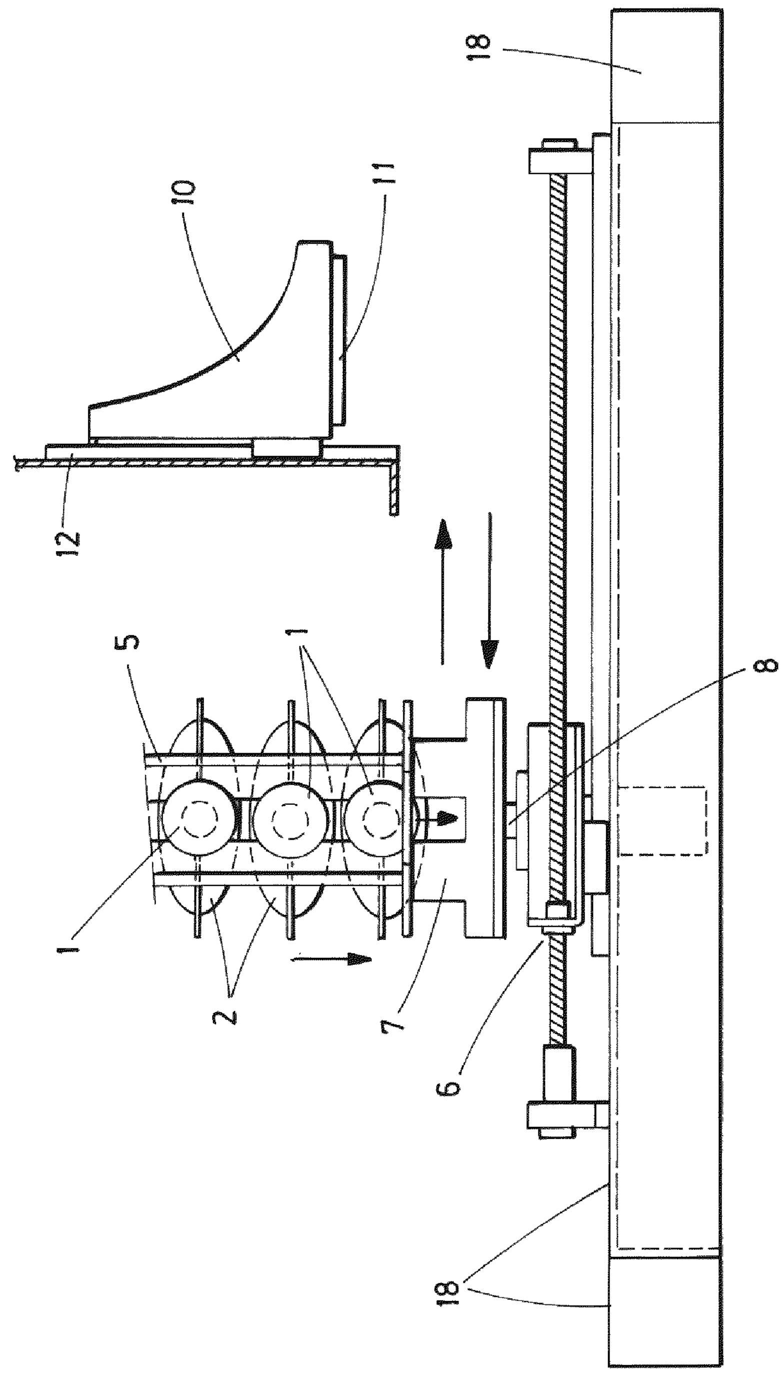
FIG. 4.—Shows a detailed top view of the dispensing clamp picking up the container, securing it by the cap.

As seen in FIG. 3, when the product to be dispensed is selected, the dispensing mechanism (9) starts to operate. The dispensing mechanism (9) comprises a dispensing clamp (7), which is movable by means of a first guide (6), associated with the fixed structure (18), from the storage mechanism (19) to the dispensing area, said dispensing clamp being intended to collect the container (2) from the storage mechanism (19) by the cap (1), as shown in FIG. 3.

Figure 5:
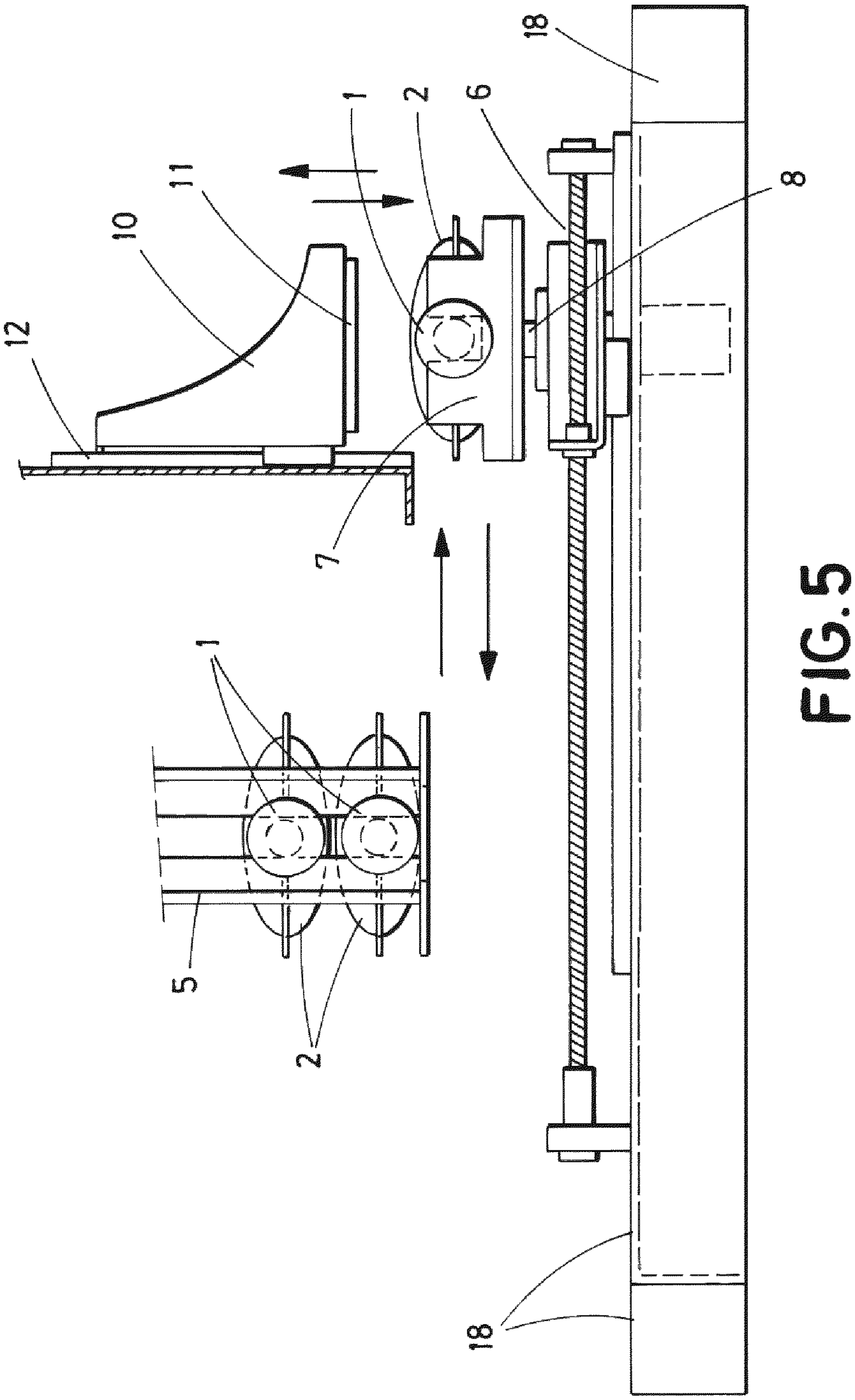
FIG. 5.—Shows a detailed top view of the heating clamp moving closer to the container located in the dispensing clamp.

As can be seen in FIG. 5, the dispensing mechanism (9) further comprises a heating clamp (10), which can move on a second guide (12), associated with the fixed structure (18) and perpendicular to the first guide (6), from a position away from the container (2), to the dispensing area, coming into contact with the container (2), which the dispensing clamp (7) holds by the cap (1).

Figure 6:
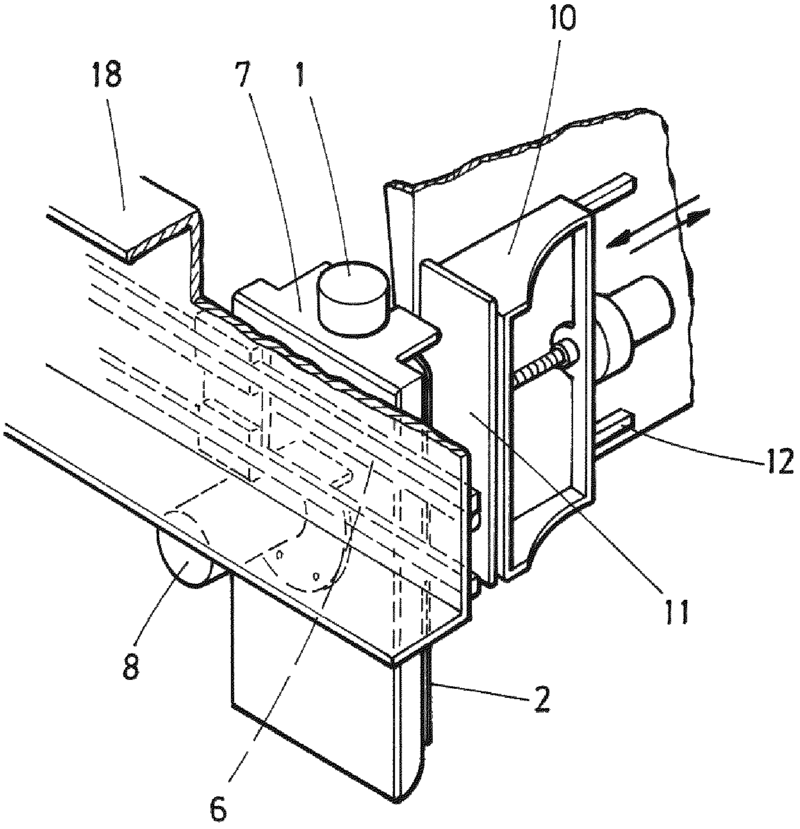
FIG. 6.—Shows a detailed view of the heating clamp in contact with the product in order to heat it.
Figure 7:
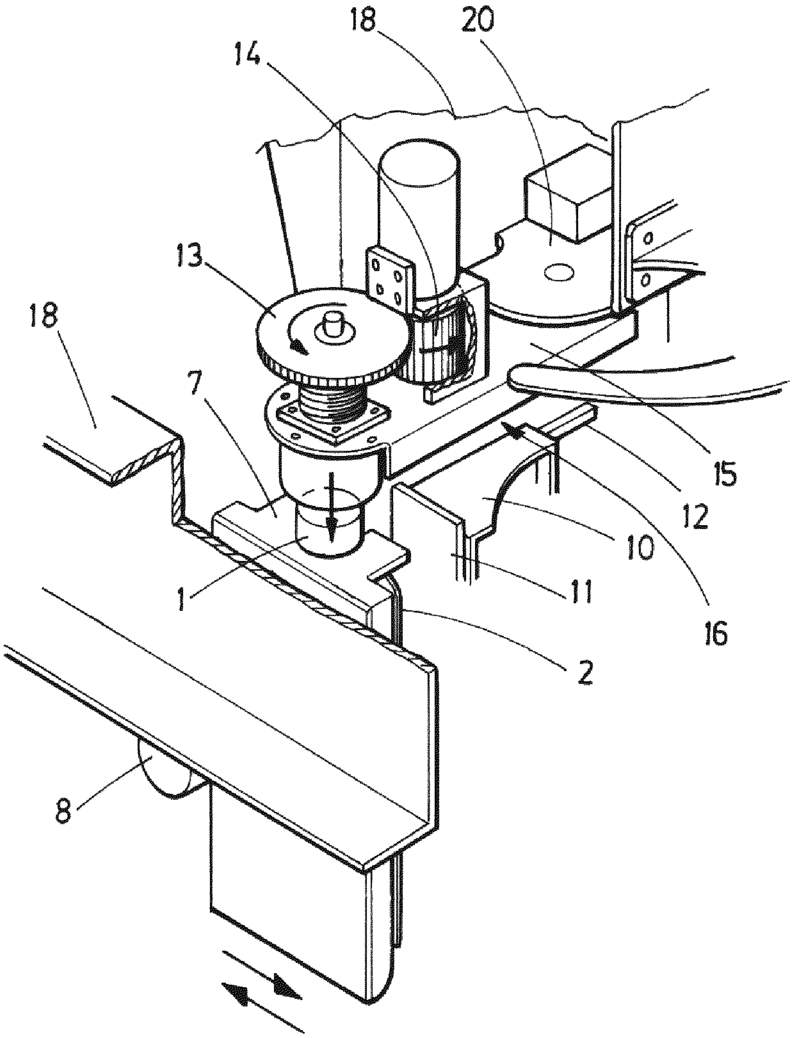
FIG. 7.—Shows a view of the uncapping mechanism before removing the cap from the container.

As can be seen in FIG. 6, there is a heater (11), which is intended to heat the product contained in the container (2), located on the face of the heating clamp (10) that comes into contact with the container (2).

Once the product has been heated, the uncapping mechanism (16), which is shown in FIG. 6, removes the cap (1) from the container (2). Therefore, the uncapping mechanism (16) comprises a bent structure (20) associated with the fixed structure (18), a mobile platform (15), associated with the bent structure (20), and that can be moved with respect to it from the dispensing area to a cap removal area.

The uncapping mechanism (16) further comprises a motor (14), positioned on the mobile platform (15), and an uncapping element (13), which is associated with the motor (14).

Figure 8:
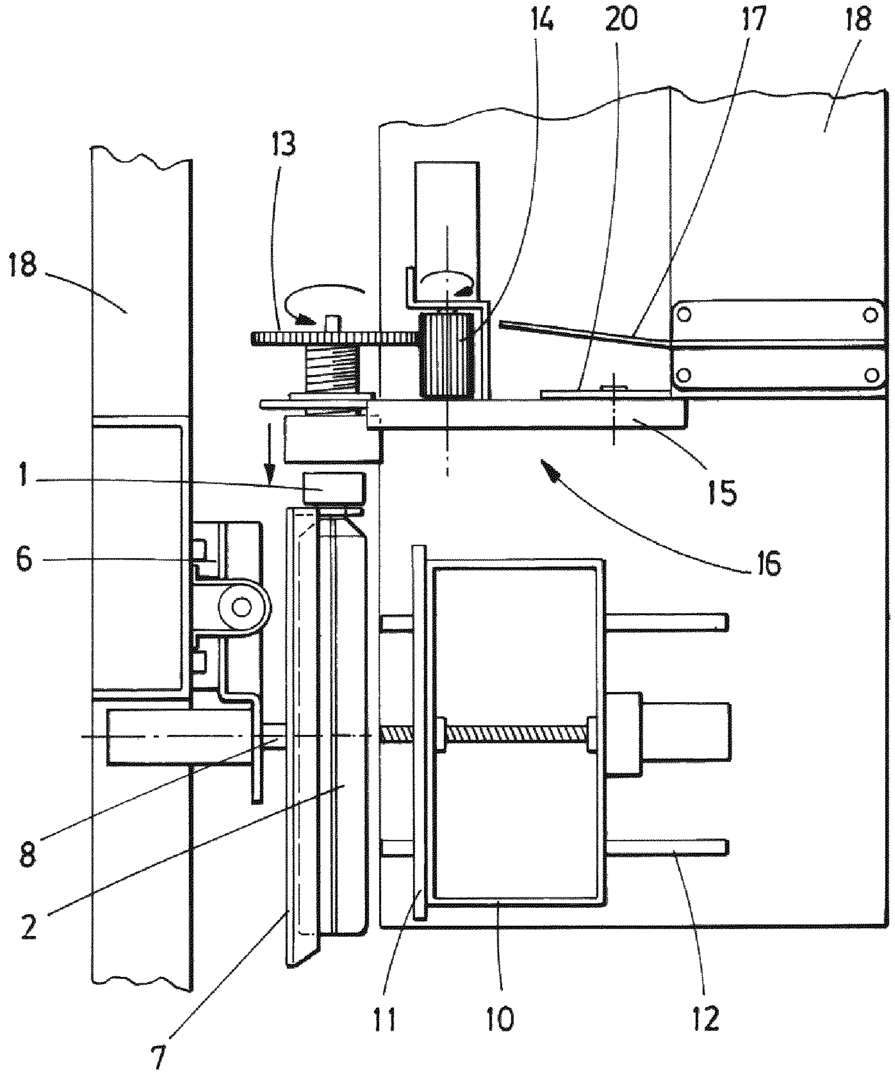
FIG. 8.—Shows a detailed side view of the uncapping mechanism removing the cap from the container.

As shown in FIG. 8, when the mobile platform (15) is positioned in the dispensing area, the uncapping element (13) is located over the cap (1) of the container (2) held by the dispensing clamp (7). When the motor (14) is started, the uncapping element (13) rotates on itself and descends vertically, coming into contact with the cap (1), unscrewing and holding it once it has been detached from the container (2).

Figure 9:
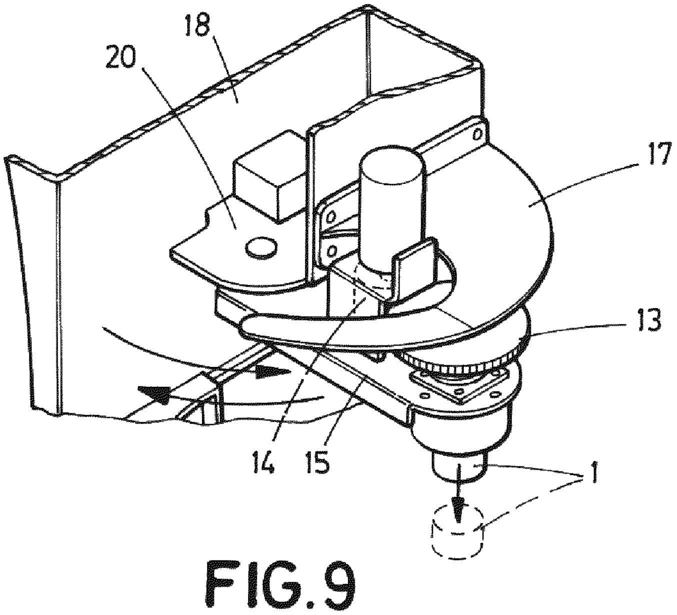
FIG. 9.—Shows a view of the protrusion of the uncapping mechanism when it comes into contact with the uncapper.

Once the cap (1) has been collected, the mobile platform (15) moves from the dispensing area to the cap removal area. In the cap removal area, a protrusion (17), which is associated with the bent structure (20) that appears in FIG. 9, is positioned.

Figure 10:
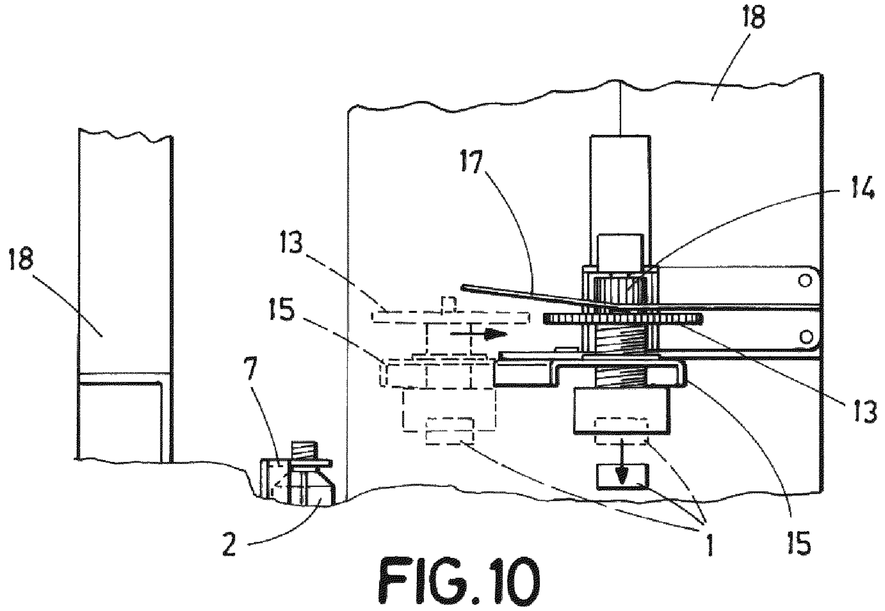
FIG. 10.—Shows a detailed side view of the uncapper in contact with the protrusion when the cap is released.

As shown in FIG. 10, when the mobile platform (15) enters the cap removal area, the uncapping element (13) comes into contact with the protrusion (17), which presses vertically downwards, releasing the cap (1) from the uncapping element (13).

Lastly, once the product is hot and the cap (1) is removed from the container (2), the product is served. Therefore, the device comprises a turning mechanism (8), which appears in FIG. 11. The turning mechanism (8) is associated with the first guide (6) and with the dispensing clamp (6) and can rotate on itself. When rotating on itself, the turning mechanism (8) pulls the dispensing clamp (6) that holds the container (2) which no longer has a cap.

Figure 11:
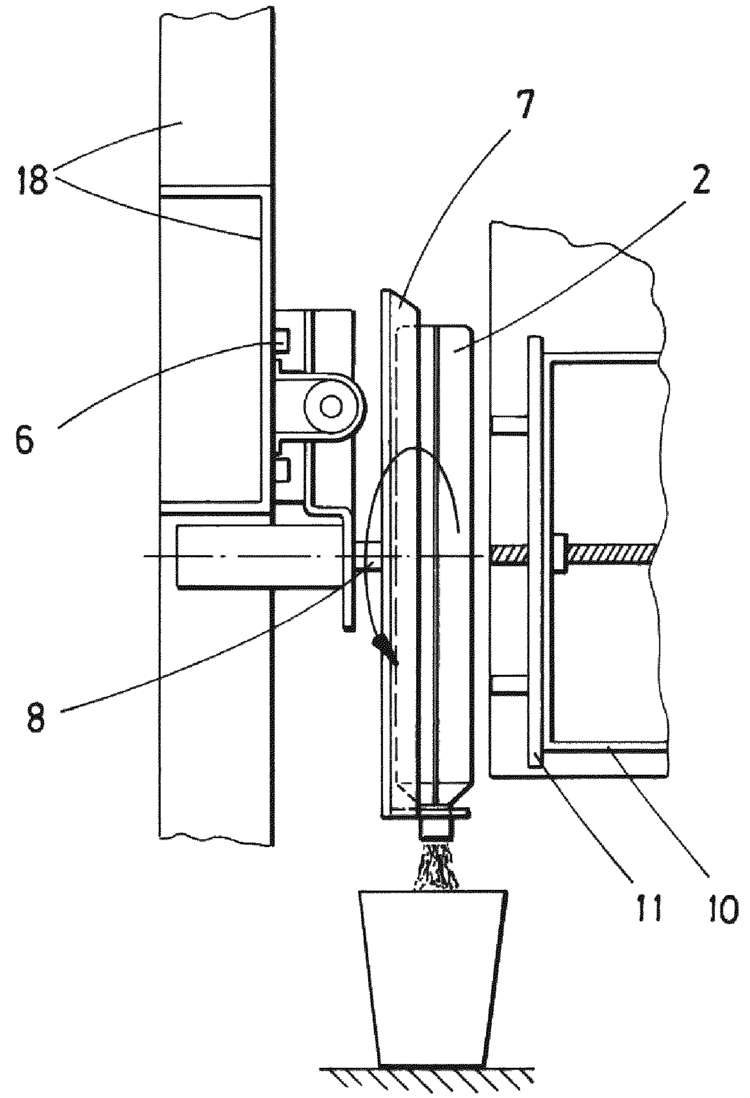
FIG. 11.—Shows a detailed view of the turning mechanism rotating 180° and pouring the product out of the container without a cap.

As illustrated in FIG. 11, the container (2) rotates on itself an angle of 180°, the liquid product being poured into, for example, a bowl or glass, to be consumed straight away by the user.

The invention claimed is:

1. A device for dispensing hot and cold liquid products in a dispensing machine, stored in containers provided with a cap, wherein the device comprises:

a fixed structure of the dispensing machine;

a storage mechanism for the containers associated with the fixed structure;

a dispensing area where, if a liquid product is to be served hot, the liquid product is heated, the cap is removed from one of the containers and the hot or cold liquid product contained in the one of the containers is served; and a dispensing mechanism comprising:

a first guide associated with the fixed structure; and a dispensing clamp, which is movable using the first guide, from the storage mechanism, to the dispensing area, the dispensing clamp being intended to collect the one of the containers from the storage mechanism using the cap and transporting the one of the containers to the dispensing area, wherein the dispensing mechanism additionally comprises:

a second guide, associated with the fixed structure, perpendicular to the first guide;

a heating clamp, which is movable using the second guide, from a position away from the one of the containers to the dispensing area, intended to come into contact with the one of the containers positioned in the dispensing clamp; and a heater, located on one face of the heating clamp, which comes into contact with the one of the containers, intended to heat the liquid product stored in the one of the containers, and wherein the device additionally comprises:

an uncapping mechanism associated with the fixed structure, intended to remove the cap from the one of the containers positioned in the dispensing clamp when the liquid product has been heated; and a turning mechanism, associated with the first guide and with the dispensing clamp, which rotates with respect to the first guide dragging the dispensing clamp and the one of the containers, pouring the liquid product contained in the one of the containers.

2. The device of claim 1, wherein the uncapping mechanism comprises:

a bent structure, associated with the fixed structure;

a cap removal area, where the cap is ejected;

a mobile platform, associated with the bent structure, and movable with respect to the bent structure from the dispensing area to the cap removal area;

a motor, positioned on the mobile platform;

an uncapping element, associated with the motor, which is located over the cap of the one of the containers when the mobile platform is in the dispensing area, the uncapping element rotating on itself descending vertically when the motor is activated, unscrewing the cap and holding the cap when the cap has been separated from the one of the containers; and a protrusion to the bent structure, positioned in the cap removal area, which comes into contact pressing an upper portion of the uncapping element, when the mobile platform moves from the dispensing area to the cap removal area, the cap being separated from the uncapping element, the cap falling by gravity.

3. The device of claim 1, wherein the storage mechanism comprises:

at least two pairs of gears, associated with the fixed structure;

at least two chains, each one surrounding at least one of the at least two pair of gears; and at least one storage guide, attached to the at least one of the at least two chains and positioned horizontally, intended to hold the containers secured by the cap with the one of the containers hanging under the at least one storage guide.

4. The device of claim 1, further comprising:

a second storage mechanism;

a second dispensing mechanism;

a second uncapping mechanism; and a second turning mechanism, wherein the second storage mechanism, the second dispensing mechanism, the second uncapping mechanism, and the second turning mechanism are intended to serve cold liquid products.

5. A method for dispensing hot and cold liquid products, which uses the device described in claim 1, comprising the following steps:

selecting the liquid product to be dispensed;

collecting the one of the containers containing the selected liquid product from the storage mechanism with the dispensing clamp, holding the one of the containers by the cap; and moving the dispensing clamp through the first guide to the dispensing area, wherein the method additionally comprises the steps of:

moving, if the liquid product is served hot, the heating clamp through the second guide until the heating clamp comes into contact with the one of the containers;

heating, if the liquid product is served hot, the liquid product contained in the one of the containers with the heater associated with the heating clamp;

unscrewing and removing the liquid product cap with the uncapping mechanism; and rotating the turning mechanism that pulls the dispensing clamp, pouring the liquid product contained in the one of the containers into a vessel.

* * * * *